US006801907B1

(12) United States Patent
Zagami

(10) Patent No.: US 6,801,907 B1
(45) Date of Patent: Oct. 5, 2004

(54) SYSTEM FOR VERIFICATION AND ASSOCIATION OF DOCUMENTS AND DIGITAL IMAGES

(75) Inventor: Anthony Zagami, Jupiter, FL (US)

(73) Assignee: Security Identification Systems Corporation, Palm Beach Gardens, FL (US)

( * ) Notice: Subject to any disclaimer, the term of this patent is extended or adjusted under 35 U.S.C. 154(b) by 0 days.

(21) Appl. No.: 09/545,941

(22) Filed: Apr. 10, 2000

(51) Int. Cl.[7] .................................................. G06F 7/00

(52) U.S. Cl. .................. 707/3; 707/2; 707/9; 713/186; 340/5.2

(58) Field of Search ............................. 713/186; 707/3, 707/2, 203, 9; 340/5.2

(56) References Cited

U.S. PATENT DOCUMENTS

| | | | | | |
|---|---|---|---|---|---|
| 5,420,924 | A | | 5/1995 | Berson et al. | 713/186 |
| 5,469,506 | A | * | 11/1995 | Berson et al. | |
| 5,657,389 | A | * | 8/1997 | Houvener | 713/186 |
| 5,781,665 | A | * | 7/1998 | Cullen et al. | |
| 5,787,186 | A | * | 7/1998 | Schroeder | |
| 5,841,886 | A | * | 11/1998 | Rhoads | |
| 5,864,622 | A | | 1/1999 | Marcus | 713/186 |
| 5,913,542 | A | * | 6/1999 | Belucci | 283/75 |
| 6,038,333 | A | * | 3/2000 | Wang | |
| 6,075,455 | A | * | 6/2000 | DiMaria et al. | |

* cited by examiner

*Primary Examiner*—Shahid Alam
*Assistant Examiner*—Hung Pham
(74) *Attorney, Agent, or Firm*—McHale & Slavin, P.A.

(57) ABSTRACT

This invention provides a process and apparatus, using a computer system, peripheral equipment and uniquely designed software, for electronically capturing the image(s) of one or more persons and/or objects, associating such image(s) with a database record and printing or otherwise transferring to a document (including, but not limited to, tickets, cards, tags and passes) a unique coding or symbology. When later required, the person(s) and/or object(s) associated with the document can be verified by visually comparing such person(s) or object(s) with the displayed image(s) recalled from the computer memory by using the symbology on the document to locate the database record and image file, or reconstructed from the symbology or coding on the document itself by using various decoding algorithms.

1 Claim, 6 Drawing Sheets

SYSTEM FOR VERIFICATION AND ASSOCIATION OF DOCUMENTS AND DIGITAL IMAGES

FIELD OF THE INVENTION

The invention relates generally to a method and apparatus, as implemented by a software program on a computer system, for production of documents which may be visually associated with an image of one or more person (s) and/or objects(s) to verify the association of such document with such specific person(s) and/or object(s). The invention relates particularly to a method and device for maintaining a real-time inventory of all persons on board a cruise ship or the like; and most particularly relates to a method and device which permits instantaneous data acquisition and recognition.

BACKGROUND OF THE INVENTION

Traveling on cruise ships, trains, airplanes or the like offer their patrons numerous.wonderful adventures. However, the crew of the particular craft or vessel must constantly be able to tightly monitor the security of thereof to assure the safety of its passengers in a nonintrusive fashion. For ease of explanation, the instant disclosure will concentrate on implementation of the method and apparatus on a cruise ship; however the inventor fully contemplates implementation of the invention on trains, planes, hotels, convention headquarters and the like where it is advantageous to quickly and easily monitor, identify and inventory personnel.

As cruise ships come to resemble large resorts at sea, they increasingly confront some of the same security issues as resort hotels on land. Additionally they have an even bigger problem, as they cross international boundaries and face even larger threat levels due to problems and political issues confronting the various countries and their ports of call. Pirates, terrorists, thieves, public drunkenness, smuggling arms and contraband are just a few of the problems. There are different threat levels, depending on where you are and what is going on at the time.

Combating terrorism is generally accomplished by carrying out a variety of security checks on all baggage and carry-ons, a tight control of everyone coming on and off the ship, as well as vigilance by security officers while in port. Every bag that comes aboard the ship is checked, making ships safer than airports which only check 10 to 20 per cent of luggage. Additionally, all passengers are required to pass through metal detectors as in an airport.

A typical cruise may have upwards of 2500 passengers getting on, and off, a ship all at one time. Accurately accounting for all of these passengers, related guests and crew in an efficient way poses a vexing problem. The most recent Coast Guard and SOLAS regulations require access control, however until recently, there were no electronic systems that fitted the needs of cruise ships. Access control was originally accomplished by the use of a paper pass which allowed the passenger on and off the ship but was not a very accurate accounting of actual identities. Subsequent to the paper pass, multifunctional plastic cards came into use. These cards allowed the passenger access and exit from the ship and the ability to charge merchandise and gain cabin access, however the ship's personnel were unable to maintain an accurate record of who had or had not yet boarded the ship when it was ready to leave port. Additionally, the cards could be forged or tampered with, thereby exposing the ship to access by unauthorized personnel.

There are numerous hazards that may face a cruise ship and her crew. Firstly, one must recognize that there is an ever-present threat of terrorism. Should a boarding pass be forged, misplaced or permitted to fall into the wrong hands, a person of less than reputable character could easily board the vessel and take those.occupants hostage, such as occurred on the Achille Lauro in 1985.

Secondly, there is the possible occurrence of illegal immigration. While this may or may not place the passengers in direct danger, it could certainly permit the prohibited passage of unwanted and unauthorized individuals to foreign lands. Such a situation occurs simply by the obtaining of a pass by foreigners who are allowed to travel internationally, who once aboard, smuggle the pass back to immigrants waiting on shore to illegally board the vessel as stowaways.

Thirdly, the trafficking of illicit drugs is a situation that must be addressed. By the very nature of their function, cruise ships allow patrons to pass freely from country to country. This mode of transportation is often very attractive to smugglers who not only can deliver their precious cargo, but enjoy a nice vacation as well.

Furthermore, one must also recognize that boarding of the vessel by an unauthorized individual provides that individual with an opportunity to steal possessions of the patrons and slip away without being detected. Due to the fact that the thief is not on the ship's docket, it is virtually impossible to isolate a possible suspect.

Aside from preventing passage to undesirables, one must also confront the issue of assuring those that should be on the ship are. Crew members must be able to ascertain whether or not all of the patrons have boarded the vessel before it leaves port. This often consists of a lengthy and tedious cabin call process in which they attempt to manually count all those who are presently on the vessel.

Further, the vessel's crew must be able to distinguish the difference between those that are permitted to carry a firearm and those who are restricted from doing so. The possession of a gun is permitted in many countries and it provides a sense of protection to those who bear them. These patrons are often forced to go through extensive amounts of paperwork on numerous occasions, while those who do not have this right may easily slip through the cracks due to the laborious amount of processing.

Additionally, because a cruise is mainly a festive occasion that often accompanies drinking, the crew must be able to readily deal with cases of domestic violence and public disturbances brought about by excessive drinking. In these scenarios, the offender might simply hide on the ship, thereby thwarting authorities that may be looking for him or her, possibly awaiting a chance to cause more problems.

Should the ship catch on fire or begin to take on water forcing an emergency evacuation, it is necessary to be able to find all the passengers and assure that they have reached safety. This can often be difficult should a passenger be trapped, hiding, due to the state of confusion, forgotten about. Once again, in these instances a manual head count would occur which wastes precious time and can often be incorrect due to the pressures of the situation.

In addition, if a passenger receives an emergency call the process of checking the several possible locations of the patron are incredibly inefficient and may not locate the client in time. This could have grievous results in extreme cases.

Lastly, one must confront the constant conflict between assuring the necessary protection for patrons and the efficiency of boarding/docking procedures. Passengers of cruise lines are there to enjoy themselves and often grow frustrated with the extensive delays incurred upon boarding the ship or exiting the vessel at port in foreign lands.

When specific types of documents are issued on behalf of one or more specific person(s) or object(s) it may be necessary to verify the association of such document with the person(s) or object(s) to deter the unauthorized use of such document on behalf of a person(s) or object(s) not associated with the document. The fastest and easiest way to verify an association is by visual verification of validated information concerning the authorized person(s) and/or object(s) and the actual person(s) and/or object(s) for which use of the document is sought. An individual whose responsibility it may be to verify the authorized use of a document on behalf of specific person(s) or object(s) can easily confirm such authorized use if he or she has immediate availability to such verified information concerning the person(s) or object(s) associated with the document.

Various methods of deterring the unauthorized use of documents have been commonly used. Such methods include a printed description of the authorized person(s) or object(s) on the document, a specimen signature(s) and/or fingerprint(s) of authorized person(s) on the document or the serial or model number of authorized object(s) on the document, and/or the placement of a photograph or printed image of the person(s) and/or object(s) on whose behalf the document is issued directly on the document itself.

The verification means previously described all have a significant drawback. Each means requires close examination of the document and the allegedly authorized person(s) and/or object(s) claiming association with the document. Additionally, all the means described above to deter unauthorized use can be circumvented by tampering with or forging the document itself. Unfortunately, document security methods used to deter forgery and tampering all significantly add to the document's expense and increases the time required to produce documents resistant to such forgery or alteration.

Accordingly, a method and apparatus are needed whereby 1) a document can be associated with person(s) and/or object(s) that will not result in an increase in the time and expense in producing the document; 2) forgery and tampering will have little probability of defeating the verification thereof, and 3) intrusive or otherwise time consuming involvement of verification personnel in inspection of the person(s) or object(s) concerned is minimized.

DESCRIPTION OF THE PRIOR ART

U.S. Pat No. 5,420,924 entitled "Secure Identification Card and Method and Apparatus for Producing and Authenticating Same By Comparison of a Portion of an Image to the Whole" is drawn to an identification card and method and apparatus for producing and authenticating such an identification card. An object or other entity for which the identification card will evidence identity, status or characteristics is scanned to produce a digital signal a portion of which is compressed, encrypted, and coded and which is recorded on a magnetic strip on the identification card. The image is also printed or otherwise embodied onto another portion of the identification card. A text message may be appended to the signal before it is encrypted and also printed as plain text on the identification card. In one embodiment the signal representing the image is encrypted using a public key encryption system and the key is downloaded from a center. This key may be changed from time to time to increase security. To facilitate authentication the corresponding decryption key is encrypted with another key and incorporated on the card. To validate the card the coded message is scanned, decoded, decrypted, expanded and displayed. The card may then be authenticated by comparison of the displayed representation stroboscopically superimposed on the image and the displayed text message with the image and text message printed on the card.

U.S. Pat. No. 5,864,622 is entitled "Secure Identification Card and Method and Apparatus for Producing and Authenticating Same" and is drawn to an identification card and method and apparatus for producing and authenticating such an identification card. An object or other entity for which the identification card will evidence identity, status or characteristics is scanned to produce a digital signal which is compressed, encrypted, and coded as a two dimensional barcode or as some other appropriate form of coding, which is incorporated into one portion of the identification card. The image is also printed or otherwise embodied onto another portion of the identification card. A text message may be appended to the signal before it is encrypted and also printed as plain text on the identification card. In one embodiment the signal representing the image is encrypted using a public key encryption system and the key is downloaded from a center. This key may be changed from time to time to increase security. To facilitate authentication the corresponding decryption key is encrypted with another key and incorporated on the card. To validate the card the coded message is scanned, decoded, decrypted, expanded and displayed. The card may then be authenticated by comparison of the displayed representation of the image and the displayed text message with the image and text message-.printed on the card.

U.S. Pat. No. 5,841,886 entitled "Security System for Photographic Identification" is drawn to a process wherein the security of photographic identification documents is enhanced by embedding within the photographic image encoded information that may be correlated to other information pertaining to the individual represented by the image, such other information being, for example, printed on the document adjacent to the photograph.

U.S. Pat. No. 5,787,186 entitled "Biometric Security Process for Authenticating Identity and Credit Cards, Visas, Passports and Facial Recognition" is drawn to a biometric security procedure for manufacturing an identity document, such as an identity card, credit card, visa or passport, which includes the steps of: providing a nucleus of the identity document, the nucleus including personal data of a holder of the identity document and a face image of the holder; carrying out, by a computer and an image capturer such as a scanner or a video camera, an analysis of face features of the face image, the computer carrying out an analysis of basic face features of the face image, comparing the basic face features with master/pattern features in a data base, wherein each master/pattern feature has a specific number; obtaining by the analysis a derived set of master/pattern features that corresponds to a characteristic synthetic image of the holder, the derived set of master/pattern features corresponding to a specific numeric code determined by the number of each of the master/pattern features making up the derived set of master/pattern features; and printing the specific numeric code by a printer connected to the computer, on an area of the identity document defined as a code window, whereby the specific numeric code unequivocally characterizes the holder of the identity document.

U.S. Pat. No. 5,469,506 entitled "Apparatus for Verifying an Identification Card and Identifying a Person by means of a Biometric Characteristic" is drawn to a system wherein a biometric, which is a substantially stable physical or behavioral characteristics of a person which can be automatically measured and characterized for comparison, is included within an identification card in the form of an encrypted representation of the biometric characteristic, which may be a finger print or a description of the manner in which the person signs his or her name, including the order and velocity in which strokes comprising a signature are written. The identification card is validated, and the person identified by an apparatus including a scanner which simultaneously scans two fields. The card is position in the first field and the biometric (e.g. a thumbprint) is simultaneously positioned in the second field and both are scanned at once, to produce a composite signal including both the code of representation and the scanned biometric. A microprocessor separates the composite signal, decodes the coded representation, and compares it to the stand biometric to validate the card. By simultaneously scanning both the coded representation and the biometric with a single scanner the cost of the apparatus is reduced as is the opportunity for a breach of security.

All of the above references fail to teach an apparatus or a method for its use capable of high speed interactive photo identification and access control which simultaneously provides tracking, screening, identification and verification of personnel, in real-time, across multiple points of ingress and egress.

What is required is a means of document verification that takes advantage of existing automation technologies to take digital image(s) of person(s) and/or object(s), to digitally store such images and associate them with a database record for the document in question, and to use symbology or recording medium on the document to reference or actually store the image(s).

When verification is required, the invention will almost instantaneously display or print the image(s) by recalling the image(s) from a protected computer memory or reconstructing the image(s) from the symbology or recording medium on the document itself for visual comparison between the person(s) and/or object(s) themselves and the registered image(s).

It is particularly useful if such method can be accomplished without significantly increasing the time required to produce the document, without significantly adding to the expense of producing the document, and which upon presentation of the document, allows virtually instantaneous display of the image(s) for verification. Such a process and apparatus will then permit a continuous stream of document verification to occur with little or no delay in the through-put of persons or objects subject to such verification.

SUMMARY OF THE INVENTION

The instant invention is an automated personnel assisted security system that provides safety to cruise ship patrons without causing undue hardship. The system comprises a high-speed, interactive photo identification and access control system. In one embodiment, prior to boarding ship, guests stop at a kiosk to have their photo taken, and within a matter of seconds they are given an identification card. Each time guests exit or enter the vessel, they insert their card into a kiosk near the ship's gangway. Computer terminals monitored by ship's security personnel display the photo and other identifying information, as well as track the exact times of exit and entry.

In an alternative embodiment, upon entering the ship the client's picture is taken and combined with database information on that person. They are then issued a card that may be used to enter their rooms, purchase items on the ship, and as their boarding pass. This card also allows the crew members to track patrons on the ship and readily ascertain whether or not they have disembarked the vessel through a system of bar codes and terminals. Upon boarding the ship a client or crew member is asked to insert their card into a terminal.

In a particularly preferred embodiment, the terminal's card reading system utilizes a specially designed system of mirrors that allows the card to be read in several different directions, thereby reducing the amount of time needed to board the vessel. Once the card has been inserted, the terminal takes a picture of the patron and compares it to the photograph on file. If they match, the passenger boards the vessel, usually in a process that takes less the two seconds. This substantially reduces the amount of time normally required to board a vessel, while also greatly increasing the level of security through the comparison of photo identification. Being able to readily compare pictures of possible entrants to those on file prevents illegal immigrants, thieves, and such unauthorized persons from boarding the ship. It also allows crew members to be alerted when an honored guest has boarded the ship, so that he or she may be afforded special attention.

The computer generates a list each day which provides details regarding who left the ship that day, at what time, and the time at which they returned. This has several advantages, 1) it greatly reduces the possibility of accidently leaving a client behind once the ship disembarks, 2) should a patron be missing it provides information about what tour the person may be on or a picture so the authorities may locate and readily identify the client, 3) furthermore, at any given moment a crew member can access information regarding how many people are on the ship, who they are, and their cabin location. In some instances, the crew may also be able to track a passenger's instantaneous whereabouts by monitoring card activity. These advantages can prove to be an extremely valuable asset. Should an emergency call come in for a passenger the system can locate him or her in an expedient fashion or alert them to the situation as soon as they board the ship, if they were not on the vessel when the call arrived.

Additionally, if the ship begins to take on water or a fire breaks out the passengers can be located and counted readily to assure to the safe evacuation of all. In such situations, the use of the security device saves precious time and eliminates the possibility of counting errors.

Furthermore, should a situation of gross public intoxication or domestic abuse arise the crew members will be able to accurately ascertain the location of the offender to prevent any further disturbances.

By use of the instant security system, the threat of drug trafficking is greatly reduced through the use of databases that portray the past information of patrons. If a passenger is a suspected smuggler of illicit drugs, the customs agents would be automatically alerted through the use of the terminals allowing for further investigation.

If a passenger should happen to lose their identification card, it is automatically deactivated. This prevents unauthorized personnel from accessing the ship under fraudulent pretenses.

The processing time of clearing customs is greatly reduced. Passports and other pertinent travel information is contained on the passenger identification that allows the crew to pre-clear patrons before docking in a scanning process that takes about three seconds.

The system also works in conjunction with metal detectors to assure that those who are permitted to carry firearms are not harassed, and those that should not possess a gun are readily identified.

Accordingly, it is an objective of the present invention is to provide a method and apparatus to deter unauthorized use of a document by the application of a software program on a computer system which takes a digital image of person(s) and/or object(s) and which associates such image(s) with a database and record information concerning such person(s) and/or object(s). The reference to the document is coded on the card using symbology or coding applied to a chip or magnetic medium on or otherwise embedded in the card. When the document is presented for verification, the document is applied to a sensing mechanism the symbology or coding is interpreted, the database is queried, the specific image file(s) associated with the record identified, and the registration image(s) displayed or printed. In this manner, the individual making the verification, can assure him or herself that the person(s) or object(s) attesting to association with the document are the person(s) or object(s) appropriately registered and actually associated with the document in the system database and memory.

A further objective of the present invention is to provide a method and apparatus to deter the unauthorized use of a document by the application of a software program on a computer system which takes a digital image(s) of person(s) and/or object(s) which is then encoded using various algorithms into symbology and applied to a document by printing or other application. When the document is presented for verification, the symbology is scanned and decoded using various algorithms to reconstruct and display or print the registration image(s). The individual making verification can then visually compare the registration image(s) to the actual likeness of the person(s) or object(s) presenting the document to establish verification.

Yet a further objective of the present invention is to provide a method and apparatus to deter the unauthorized use of a document by the application of a software program on a computer system which takes a digital image(s) of person(s) and/or object(s), encodes.such image(s) using various algorithms and then records such digital information onto a recording medium embedded in or attached to the surface of the document itself. When the document is presented for verification, the computer system reads the recording medium on or in the document, uses decoding algorithms to display or print the registration image(s) so that the individual making verification can assure him or herself that the person(s) and/or object(s) offered as being properly associated with the document are visually verified as such.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTIONS OF THE FIGURES

Figure 4A:
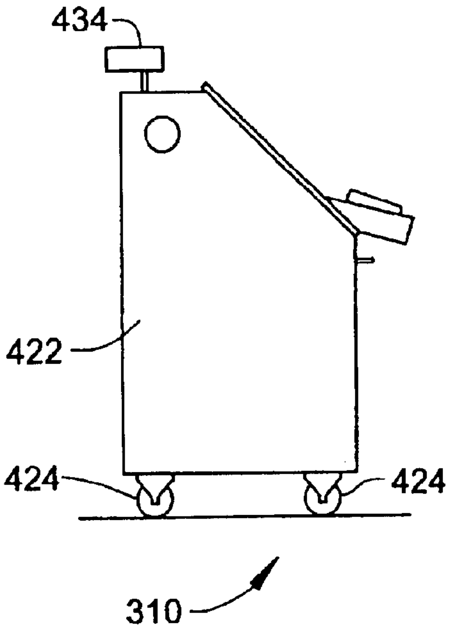
Figure 4B:
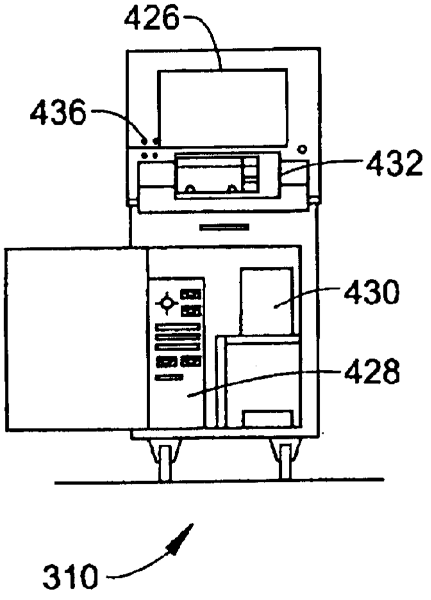
Figure 7:
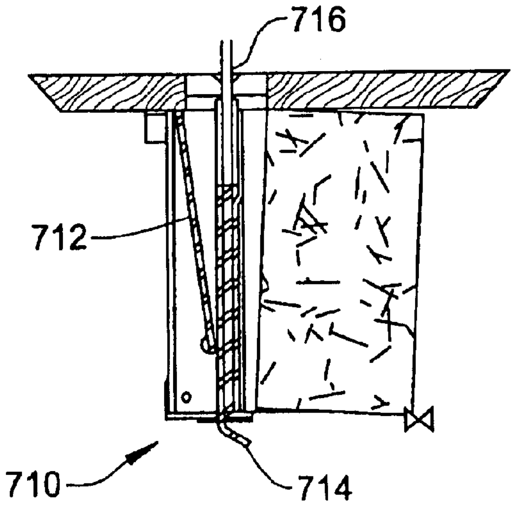
Figure 5:
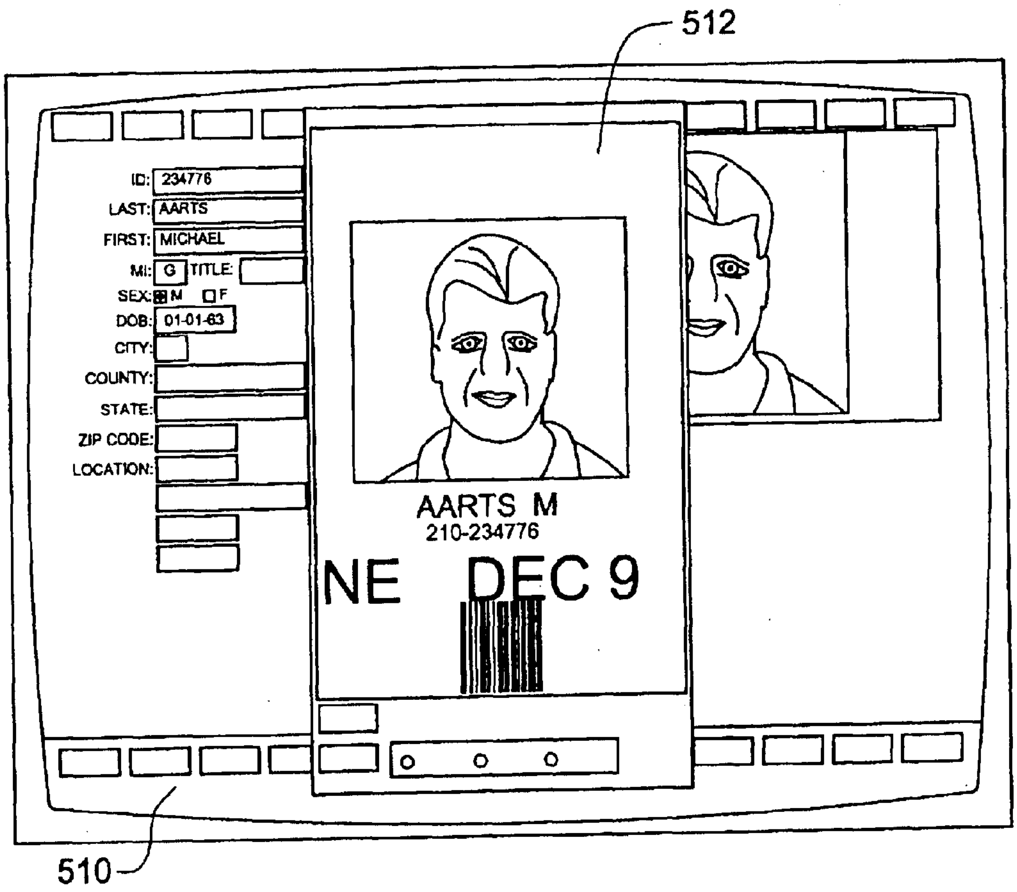
Figure 6A:
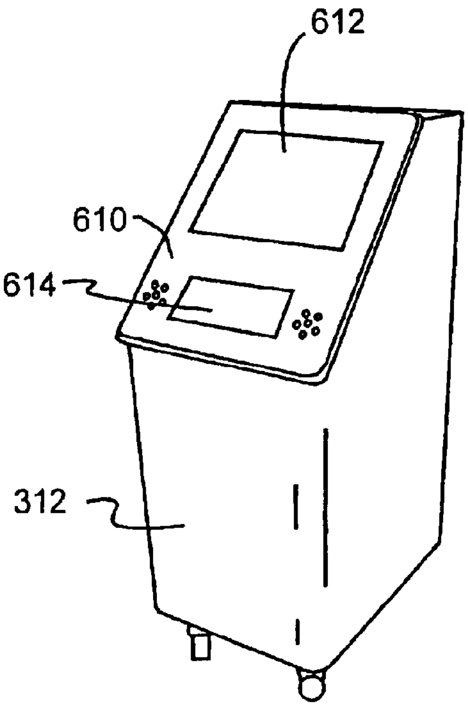
Figure 6B:
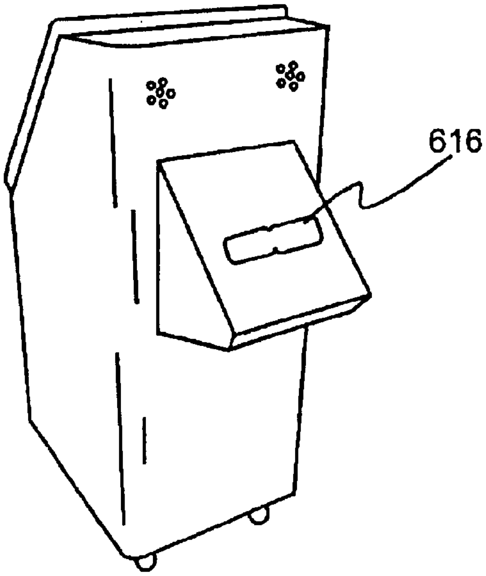

FIGS. 4*a* and 4*b* are front and side views of a photo registration station 10;

FIG. 5 is a main screen and badge preview screen of a photo registration station;

FIGS. 6*a* and 6*b* show the monitoring side and entry side of the guard registration station;

FIG. 7 is a cross-sectional view of an omnidirectional card reader.

DETAILED DESCRIPTION OF THE INVENTION

The present invention provides an apparatus and a method, as implemented on a computer, wherein a software algorithm enables the use of a method and apparatus for verification of the association of a specific document with one or more persons or objects by near instantaneous visual comparison of a registered digital image with the person(s) and/or object(s) previously associated with the specific document.

Figure 1:
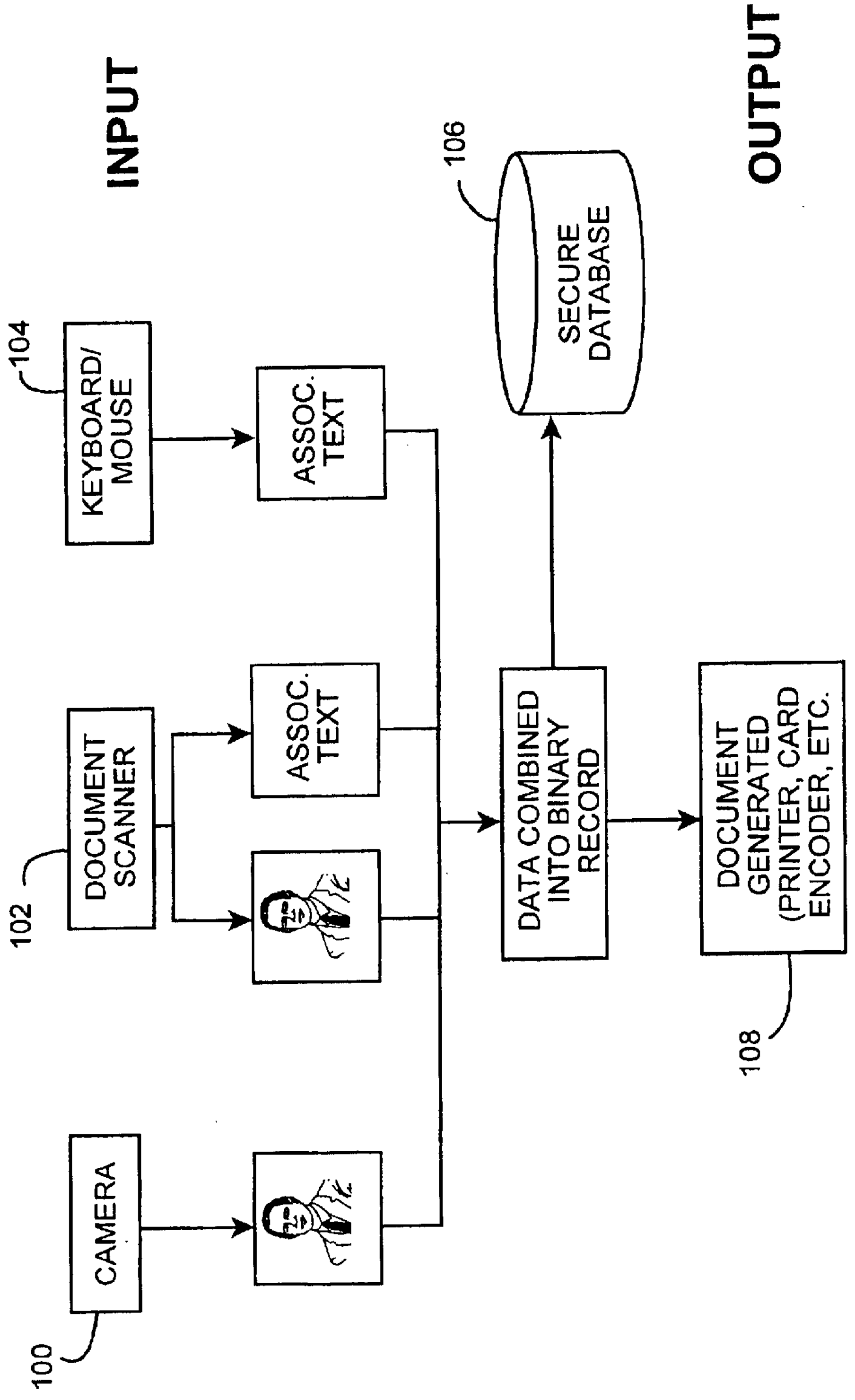
FIG. 1 is a flow-chart outlining the capture of data, formation of a secure database and generation of an identity document.

As shown in FIG. 1, the invention allows the accomplishment of this verification by digitally preparing an image or images of the authorized person(s) and/or object(s). The image may be captured by use of a digital camera 100 or a document scanner 102. Any associated text which is to be associated with the image may be input via the document scanner 102 or alternatively via a keyboard/mouse input device 104 Such image is then associated with the person(s) or object(s) and stored in a secure database record 106, thereby forming a unique identifier dataset. The document, which is a portable media, may then be generated, via a printer, card encoder or the like 108 which applies the symbology or coding to the document, the record, image(s) and document together, or the image and any necessary data is directly translated into symbology on the document or translated onto a recording medium embedded in or on the document.

Figure 2:
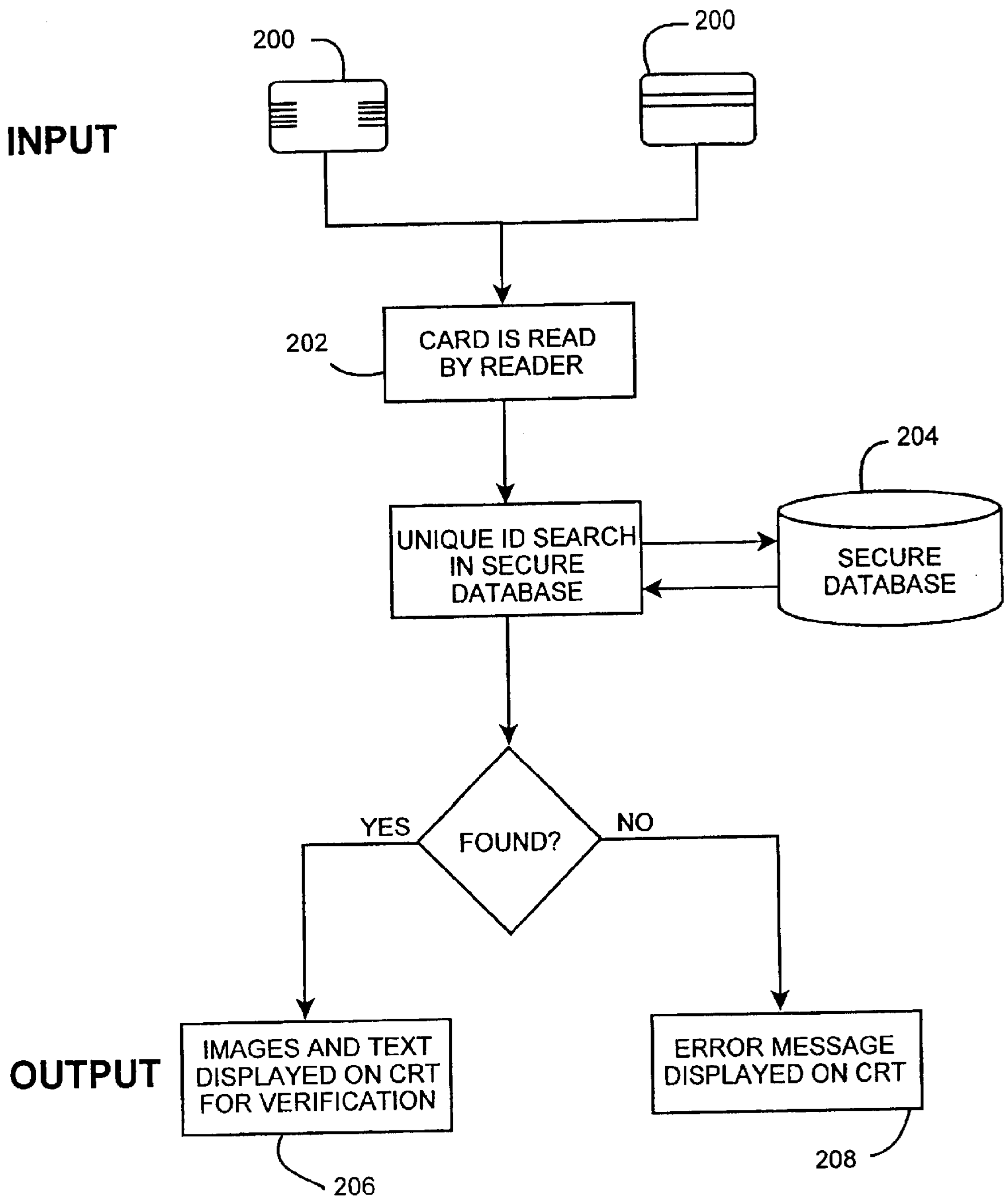
FIG. 2 is a flow chart outlining the process of identification, verification and updating of the secure database.

As further outlined on FIG. 2, when the document 200, which may, for example contain a magnetic stripe or single or two-dimensional barcode, is later produced for verification, a symbology or recording medium sensing device 202 is applied to the document which then either finds the associated image(s) file(s) by querying the secure database of the available computer or network memory 204 or alternatively may. reconstruct the associated image(s) directly from the symbology or recording medium itself using computer stored decoding algorithms. The display or printing of the original image(s) 206 permits the person verifying the authorized use of the document to do so based upon a visual comparison of the actual person(s) and/or object(s) with the registered person(s) and/or object(s) as evidenced by the displayed or printed image(s). If the information is not found within the secure database the system defaults to display of an error message 208 which thereby alerts the guard to the possibility that the user is unauthorized.

Common documents which may be subject to such visual verification for confirmation of authenticity of use include, but are not limited to: entry passes, charge cards, boarding cards, membership cards or devices, property passes, passports, licenses, identification cards, title documents, etc. For example, in the case of a credit card, when an individual uses his or her credit card, the merchant uses a sensing devise to read the symbology or coding on the card and then connects to a database containing registration image(s) of the authorized user and his or her signature. The computer then displays or prints registration images in the store for the merchant to use in visually comparing the user and his or her signature with the registered image(s). As an alternative to obtaining the verification images from computer or network memory, the store computer can sense the symbology and/or coding on the card, decode such information using various algorithms and then generate the registration image(s) directly from such decoded information.

As further outlined in FIG. 1, prior to the creation of the document, the software program must receive input from a number of sources, such as, but not limited to, a document scanner 102, a video camera 100, or a keyboard/mouse, combination 104. These inputs are grouped into a binary record and assigned a unique identifier, so that they may be stored in an encrypted, secure database. When a document scanner is employed for input, the document scanned is separated into its two most important components, a photograph of the specific person(s) and/or object(s) and associated text. The preferred method of digitally encoding the photograph is as a compressed JPEG image. The associated text is digitally encoded through the use of optical character recognition (OCR) or visually inspected and manually entered by an operator, and is stored as standard ASCII text.

When a video camera is employed for input, it is used to capture a photograph of the specific person(s) and/or object (s). The preferred method of digitally encoding the photograph is as a compressed JPEG image.

When a keyboard/mouse combination is employed for input, they are used to enter and manipulate any text associated with the specific person(s) and/or object(s).

The software program can receive two different types of input data for verification, such as, but not limited to, a unique identifier that can be used to retrieve the digitally encoded images from a secure database, or decoding the digitally encoded images from the actual input data itself.

When a document imprinted with a standard one-dimensional barcode or embedded with a magnetic stripe is scanned or read into the software program, the software program uses the unique identifier encoded within the one-dimensional barcode or magnetic stripe to perform a search of the secure database. The result of this search yields one of two results. If the unique identifier is found within the secure database, the corresponding digitally encoded images and associated text of specific person(s) and/or object(s) are displayed on a CRT for visual verification by an operator. If the unique identifier is not found within the secure database, an appropriate error message, reflecting the negative results of the search, is displayed on a CRT so that appropriate action can be taken to correct the situation.

In an alternative embodiment, when a document imprinted with a two-dimensional barcode or embedded with a chip that can be scanned or which may emit a frequency output is read into the software program, e.g. by any suitable scanner or frequency reader, the software program decodes the digitally encoded images and associated text of specific person(s) and/or object(s) directly from the data stored on the document. These decoded images and associated text of specific person(s) and/or object(s) are displayed on a CRT for visual verification by an operator.

Figure 3:
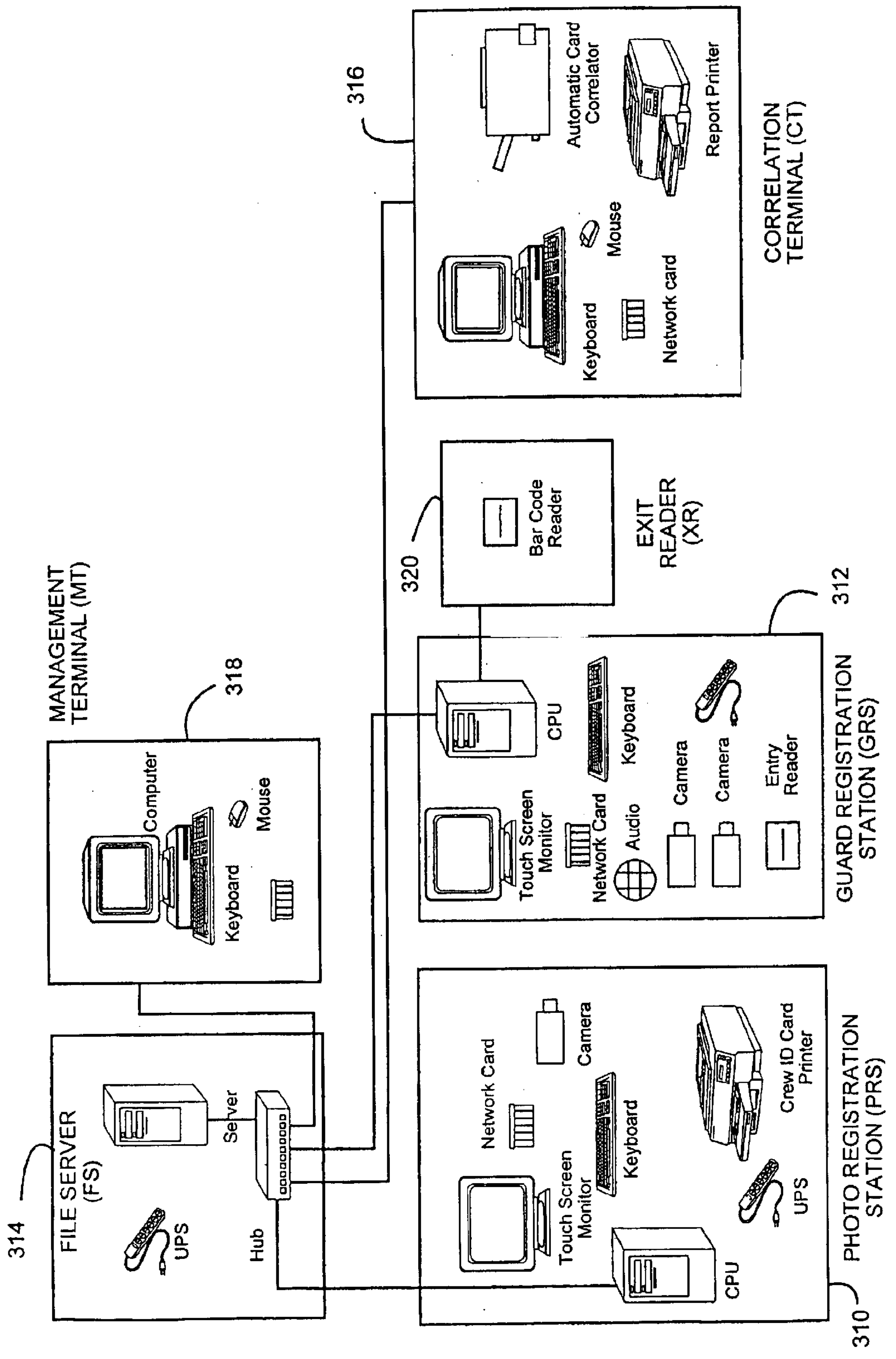
FIG. 3 is an overview of the instant invention workstation and network interconnection.

Referring now to FIG. 3 set forth is an overview of the instant invention workstation and network interconnection. The system can be differentiated into six sections with each section explained in detail later in this specification. In particular, the system consists of a photo registration station 310, a guard registration station 312, a file server 314 electrically coupled to the photo registration station and guard registration station providing access to a correlation terminal 316 and management terminal 318. Exit reader 320 is coupled to the guard registration station and photo registration by a file server. The overall amount of equipment required on a cruise ship is dependent upon size of the vessel as well as the number of operable gangway systems. A typical ship includes five guard registration systems and exit readers which are located at each of the gangways. One photo registration system is employed on a ship at the sole location for entrance. Typically one correlation terminal and two management terminals are also used on each vessel.

A photo registration station 310 is exemplified in FIGS. 4*a* and 4*b* which are side and front views, respectively of the photo registration station. The station includes a portable housing 422 made portable by the use of wheels 424 located on the bottom side of the housing for placement of items required for photo registration, namely a monitor 426 with the self-contained CPU 428, and an ID card printer 430. For input, a keyboard/mouse 432 is utilized that operates in conjunction with camera 434. With this photo registration station a passenger may approach the enclosure and by inserting the passenger's name verification can be made of the passenger's authorization to enter the vessel wherein the camera 434 may take a digital picture which is placed into the database of the central processing unit, and stored as well as printed onto a card through ID card printer 430. The photo registration station is self-contained and can be moved to different locations as needed and is coupled to the remaining system by a network interconnect with power supplied by standard electrical umbilical cord. Preferably the monitor 426 is an LCD touch monitor that facilitates the passenger in inserting data with detailed information that can be accompanied by the keyboard. An external speaker 436 is further provided for audio prompts, if desired.

Each component of the photo registration station is an individual self-contained component that is coupled together by conventional cabling allowing for ease of replacement. The station may be stand-alone or server based, for example via the use of standard 10/100 Base T networks utilizing CAT 5 wiring and RJ45 connections.

In a similar setup, it will be apparent that a guard registration station 312 may, for example, include a 15"LCD touch screen monitor and keyboard available for the guard to review passengers as they enter or exit; in addition, the enclosure may include a swing-out face having various components such as an entry reader, for example a bar code laser reader or the like, and a camera that allows the guard to compare the photo previously taken of the passenger versus the current photo providing a manual comparison as well as automatic verification of passenger allowance.

As detailed in FIG. 5, the photo registration station has a main screen 510 which allows the passenger to verify particulars regarding name, passport, driver's license and so forth while a camera is aligned for taking a digital image of the passenger. Upon the passenger's authorization the camera takes digital picture and displays on the screen the proposed badge 512 to be printed. The passenger can then review the badge to determine if the picture taken is an acceptable likeness and thereafter print the card which includes the picture as well as all detail in a bar code, magnetic stripe, or encoded chip format. The passenger would then take the card and use it for entering or exiting of the vessel with all data placed into the database such as that shown on the photo registration screen with thumbnail pictures wherein a particular individual's name may be highlighted either manually or through activation of the card with a thumbnail picture of the individual and data such as passenger, crew, contractor, visitor or any other information displayed for review on a master terminal or guard registration station allowing instantaneous identification of the individual.

FIGS. 6*a* and 6*b* show the monitoring side and entry side of the guard registration station 312, which is a compact portable structure. The monitoring side includes a sloped frontal face 610 with the monitor 612 and keyboard 614 flush mounted for ease of viewing and accessability. The enclosure includes space for placement of items such as the computer, printer, and camera (not shown), and may include an exhaust fan (not shown) to maintain the longevity of the electronic equipment. It is noted that the size of the unit can be made of any proportion and is dependent on the size of the equipment which does not circumvent the idea of the invention. The instant inventor has chosen to use individual off the shelf replaceable components allowing for ease of replacement without the need for disabling the entire system or even any major component thereof.

The guard station enables maintenance of an entry and exit log with pictures. In this manner when an individual leaves a vessel the movement can be tracked either manually or automatically by swiping of the card allowing the magnetic stripe or bar code to be read, for example in a card reader 616 mounted on the entry side (as shown in FIG. 6*b*) or by use of the encoded chip should the individual walk through a scanning enclosure. The database would track the individual that has left by setting forth the time and by inverting a display which may set forth an exit, entry or reentry. The entry and exit log includes an active list of how many passengers, crew members, or other individuals are on the ship at any time and how many individuals are authorized to be on the vessel. Upon reentry the device allows the guard to instantaneously review, on screen, the picture of the person to which the original card was issued versus the individual who is currently carrying the card. This allows the guard to make an instantaneous determination if the card has been switched or entrance is attempted by an individual unauthorized to enter the vessel.

With reference to FIG. 7, a particularly preferred embodiment of the invention includes an omnidirectional card reading device 710 which incorporates a mirrored interior panel 712 which is positioned so as to enable the card to be inserted in any direction and still be read. A removable card pocket 714 is easily removed for cleaning of the mirrored surface 712. The card reading device may contain any type of data reading device, for example a multi-line bar code reader, and through the use of the judiciously positioned mirrored surface 712, the reader can scan the card for data regardless of the orientation in which it is inserted in slot 716.

What is claimed is:

1. A method as implemented on a computer system to provide an interactive photo identification and access control system for monitoring, identifying and inventorying personnel, consisting of the steps of:

providing a photo registration station at a point of entry to an area having controlled access, the registration station including a CPU, a digital camera, a monitor, data input means, a network interface, and a sensing mechanism operable to read an access card having machine-readable media thereon containing coded identification data;

applying an access card to the sensing mechanism to retrieve the identification data coded thereon;

whereupon a digital image of one or more persons, objects or combinations thereof is taken;

storing the digital image in a database in association with the identification data to form a unique identifier dataset;

verifying the access card by application to the sensing mechanism for interpretation of the identification data coded thereon;

querying the database to retrieve the unique identifier dataset;

displaying the digital image from the unique identifier dataset on the monitor to a human operator, allowing the human operator to perform an instantaneous visual comparison of the digital image with the person bearing the access card to ascertain definitive identity confirmation of the person attesting to association with the access card in accordance with the unique identifier dataset;

recording the time of entry of a person associated with the unique identifier dataset into an access controlled area at such time the access card is verified;

recording the times of exit of a person associated with the unique identifier dataset from the access controlled area at such time the access card is verified; and storing the times of entry and exit in the database whereby a real-time inventory of personnel within the access controlled are can be maintained.

* * * * *